United States Patent
Seo

(10) Patent No.: US 10,244,026 B2
(45) Date of Patent: *Mar. 26, 2019

(54) CONVERTING CONTENT FOR DISPLAY ON EXTERNAL DEVICE ACCORDING TO BROWSER CONTEXT AND BASED ON CHARACTERISTIC OF EXTERNAL DEVICE

(71) Applicant: Samsung Electronics Co., Ltd., Gyeonggi-do (KR)

(72) Inventor: Hyung-jin Seo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/289,210

(22) Filed: May 28, 2014

(65) Prior Publication Data

US 2014/0280788 A1   Sep. 18, 2014

Related U.S. Application Data

(63) Continuation of application No. 13/172,318, filed on Jun. 29, 2011, now Pat. No. 8,769,150.

(30) Foreign Application Priority Data

Jun. 29, 2010   (KR) ........................ 10-2010-0062075

(51) Int. Cl.
*G06F 15/16*   (2006.01)
*H04L 29/06*   (2006.01)
(Continued)

(52) U.S. Cl.
CPC ........ *H04L 65/604* (2013.01); *G06F 16/9577* (2019.01); *H04N 21/4126* (2013.01); *H04N 21/4621* (2013.01); *H04N 21/6581* (2013.01)

(58) Field of Classification Search
CPC .......... H04L 65/601–65/605; H04L 29/08099; H04L 67/025; G06F 19/30905;
(Continued)

(56) References Cited

U.S. PATENT DOCUMENTS 5,508,713 A * 4/1996 Okouchi ............... G06F 3/0481
345/2.2
6,968,539 B1 * 11/2005 Huang .................. G06F 9/4425
712/E9.082
(Continued)

FOREIGN PATENT DOCUMENTS

CN   101360059   2/2009
JP   2000-347968   12/2000
(Continued)

OTHER PUBLICATIONS

Russian Office Action dated Jan. 13, 2015 issued in counterpart application No. 2013103717/08.
(Continued)

*Primary Examiner* — Lance Leonard Barry
(74) *Attorney, Agent, or Firm* — The Farrell Law Firm, P.C.

(57) ABSTRACT

Method and apparatus for converting content browsed at a device are provided. The method includes receiving information about a specification of an external device and a request signal for information related to content which is currently browsed; detecting a document object and a view from the browsed content based on received information about the external device; determining browsed content to be converted based on the detected document object; converting the determined browsed content into data that can be browsed on the external device according to the document object and the view based on the information about the external device; requesting data associated with the converted data from an external server; receiving the associated (Continued)

data; and transmitting the associated data to the external device with the converted data, wherein the document object includes content in a specific region of a screen of the device.

6 Claims, 3 Drawing Sheets

(51) Int. Cl.
*H04N 21/41* (2011.01)
*H04N 21/462* (2011.01)
*H04N 21/658* (2011.01)
*G06F 16/957* (2019.01)

(58) Field of Classification Search
CPC .......... H04N 21/4126; H04N 21/4621; H04N 21/6581; H04N 21/1426
See application file for complete search history.

(56) References Cited

U.S. PATENT DOCUMENTS

| | | | |
|---|---|---|---|
| 7,010,551 B2 | 3/2006 | Terayama et al. | |
| 7,363,384 B2* | 4/2008 | Chatani | H04L 29/06 709/203 |
| 7,467,231 B2* | 12/2008 | Kegoya | G05B 19/042 709/203 |
| 7,580,005 B1* | 8/2009 | Palin | G06F 3/1423 345/1.1 |
| 7,698,626 B2 | 4/2010 | Baluja et al. | |
| 7,721,303 B2* | 5/2010 | Alves de Moura | G06F 8/38 709/202 |
| 7,834,849 B2 | 11/2010 | Hunleth et al. | |
| 8,086,489 B2* | 12/2011 | Ramakrishna | H04L 65/605 709/203 |
| 8,181,107 B2* | 5/2012 | Melnyk | G06Q 30/02 705/14.4 |
| 8,880,587 B2* | 11/2014 | Cobb | H04N 7/17318 348/425.3 |
| 2002/0010935 A1* | 1/2002 | Sitnik | H04H 60/80 725/78 |
| 2002/0029259 A1 | 3/2002 | Okada | |
| 2002/0059367 A1* | 5/2002 | Romero | G06F 17/30905 709/203 |
| 2002/0091755 A1* | 7/2002 | Narin | H04L 67/02 709/203 |
| 2003/0164855 A1* | 9/2003 | Grant | G06F 17/3028 715/763 |
| 2004/0027375 A1* | 2/2004 | Ellis | G06F 9/4445 715/753 |
| 2004/0130568 A1 | 7/2004 | Nagano et al. | |
| 2005/0122963 A1 | 6/2005 | Jeon et al. | |
| 2006/0090122 A1 | 4/2006 | Pyhalammi et al. | |
| 2006/0146765 A1* | 7/2006 | Van De Sluis | G06F 3/016 370/338 |
| 2007/0083810 A1* | 4/2007 | Scott | G06F 17/30899 715/205 |
| 2008/0016166 A1 | 1/2008 | Beverly et al. | |
| 2008/0133655 A1* | 6/2008 | Watada | H04L 67/2823 709/203 |
| 2009/0083289 A1* | 3/2009 | Morris | G06F 17/30887 |
| 2009/0292373 A1 | 11/2009 | Miyata et al. | |
| 2010/0122180 A1* | 5/2010 | Kamiyama | G06F 17/30867 715/744 |
| 2010/0174607 A1* | 7/2010 | Henkin | H04L 65/605 709/203 |
| 2010/0192055 A1* | 7/2010 | Shaked | 705/14.53 |
| 2010/0280860 A1* | 11/2010 | Iskold | G06F 17/30864 715/234 |
| 2010/0312760 A1* | 12/2010 | Nykanen | G06Q 50/01 705/319 |
| 2011/0157004 A1* | 6/2011 | Ohashi | G06F 17/30905 707/705 |
| 2011/0181465 A1 | 7/2011 | Li et al. | |
| 2011/0252082 A1* | 10/2011 | Cobb | H04N 5/44582 345/156 |
| 2011/0320563 A1 | 12/2011 | Seo | |
| 2012/0150874 A1* | 6/2012 | Sweeney | G06F 17/30905 715/238 |
| 2012/0206645 A1* | 8/2012 | Ozawa | G06F 17/2785 707/749 |

FOREIGN PATENT DOCUMENTS

| | | | | |
|---|---|---|---|---|
| JP | 2001-236288 | 8/2001 | | |
| JP | 2001-331362 | 11/2001 | | |
| JP | 2002-111893 | 4/2002 | | |
| JP | 2002-116992 | 4/2002 | | |
| JP | 2007-509385 | 4/2007 | | |
| JP | 2009-129430 | 6/2009 | | |
| JP | 2009-194674 | 8/2009 | | |
| JP | 2009-284119 | 12/2009 | | |
| JP | 2013-518249 | 5/2013 | | |
| JP | 5916239 | 4/2016 | | |
| KR | 1020060031600 | 4/2006 | | |
| KR | 1020070043974 | 4/2007 | | |
| KR | 1020090088483 | 8/2009 | | |
| RU | 2006 106 488 | 10/2007 | | |
| WO | WO 2010052639 A1 * | 5/2010 | | H04L 67/104 |

OTHER PUBLICATIONS

Japanese Office Action dated Apr. 27, 2015 issued in counterpart application No. 2013-518249.
European Search Report dated Jun. 11, 2015 issued in counterpart application No. 11801131.1-1507.
Japanese Office Action dated Mar. 14, 2016 issued in counterpart application No. 2013-518249, 5 pages.
Chinese Office Action dated Mar. 17, 2016 issued in counterpart application No. 201180032894.7, 12 pages.
Korean Office Action dated Apr. 21, 2016 issued in counterpart application No. 10-2010-0062075, 9 pages.
Chinese Decision of Rejection dated Aug. 18, 2016 issued in counterpart application No. 201180032894.7, 13 pages.
Korean Final Rejection dated Sep. 13, 2016 issued in counterpart application No. 10-2010-0062075, 8 pages.
Korean Final Rejection (Re-examination) dated Oct. 20, 2016 issued in counterpart application No. 10-2010-0062075, 8 pages.
Korean Notice of Amendment Dismissal dated Oct. 20, 2016 issued in counterpart application No. 10-2010-0062075, 6 pages.
Japanese Office Action dated Aug. 24, 2015 issued in counterpart application No. 2013-518249, 5 pages.
Chinese Office Action dated Sep. 2, 2015 issued in counterpart application No. 201180032894.7, 15 pages.
Japanese Office Action dated Feb. 6, 2017 issued in counterpart application No. 2015-251615, 4 pages.
Japanese Office Action dated Jan. 15, 2018 issued in counterpart application No. 2015-251615, 6 pages.
Chinese Office Action dated Dec. 21, 2017 issued in counterpart application No. 201180032894.7, 22 pages.
Decision of Reexamination dated Jun. 29, 2018 issued in counterpart application No. 201180032894.7, 30 pages.
Korean Trial Decision dated Oct. 11, 2018 issued in counterpart application No. 10-2010-0062075, 27 pages.

* cited by examiner

CONVERTING CONTENT FOR DISPLAY ON EXTERNAL DEVICE ACCORDING TO BROWSER CONTEXT AND BASED ON CHARACTERISTIC OF EXTERNAL DEVICE

PRIORITY

This application is a Continuation Application of U.S. application Ser. No. 13/172,318, now U.S. Pat. No. 8,769,150, which was filed in the U.S. Patent and Trademark Office on Jun. 29, 2011and claims priority under 35 U.S.C. § 119(a) to Korean Patent Application No. 10-2010-0062075, filed on Jun. 29, 2010, in the Korean Intellectual Property Office, the disclosure of which is incorporated herein by reference.

BACKGROUND OF THE INVENTION

1. Field of the Invention

The present invention relates generally to a method and apparatus for converting content, and more particularly, to a new user interaction interface between a browser in a Computer Equipment (CE) device and a smartphone with a wireless network connection connected thereto.

2. Description of the Related Art

In order to capture a screen that is currently displayed on a TV browser, a user may directly take a picture of the screen using the smartphone's camera. However, noise may be captured depending on the frequency at which a smartphone's sensor or TV updates, or the sensor may not easily recognize the captured data due to poor image quality. Furthermore, storing and sharing captured data as images may result in a large amount of data traffic.

Another approach to capturing a screen that is currently displayed on a TV browser is to push a User Interface (UI) or application for controlling the browser on a TV side to a smartphone. However, in this case, remote UIs provided to control heterogeneous devices with different control structures are most likely not suited to each other and require a separate stacks.

SUMMARY OF THE INVENTION

The present invention has been made to address at least the above problems and/or disadvantages and to provide at least the advantages described below. Accordingly, an aspect of the present invention provides a method and apparatus for converting content adapted to detect a browsing context from content current being browsed upon the request of a user and to convert content based on the browsing content.

According to an aspect of the present invention, a method for converting a browsed content at a device is provided. The method includes receiving a request signal for information related to the browsed content from an external device; detecting at least one of a document object and a view from the browsed content based on information about the external device contained in the request signal; converting the browsed content into data that can be browsed on the external device according to the at least one of the document object and the view based on the information about the external device; and transmitting the converted data to the external device, wherein the browsed content is currently browsed at the device.

According to another aspect of the present invention, a method for converting a browsed content is provided. The method includes receiving a request signal for information related to the browsed content from an external device via a plurality of ports to each of which information about the external device is assigned; detecting at least one of a document object and a view from the browsed content based on the information about the external device; converting the browsed content into data that can be browsed on the external device according to the at least one of the document object and the view and according to a respective content type assigned to each of the plurality of ports; and transmitting the data to the external device via the plurality of ports, wherein the browsed content is currently browsed at the device.

According to another aspect of the present invention, an apparatus for converting a content browsed at a device is provided. The apparatus includes a receiver for receiving a request signal for information related to the browsed content from an external device; a controller for detecting at least one of a document object and a view from the browsed content based on information about the external device contained in the request signal and for converting the browsed content into data that can be browsed on the external device according to the at least one of the document object and the view based on the information about the external device; and a transmitter for sending the converted data to the external device, wherein the browsed content is currently browsed at the device.

According to another aspect of the present invention an apparatus for converting a browsed content is provided. The apparatus includes a plurality of ports to each of which information about an external device is assigned; a receiver for receiving a request signal for information related to the browsed content from the external device via the port; a controller for detecting at least one of a document object and a view from the browsed content based on the information about the external device and converts the browsed content into data that can be browsed on the external device according to the at least one of the document object and the view and according to a respective content type assigned to each of the plurality of ports; and a transmitter for sending the resulting data to the external device via the plurality of ports, wherein the browsed content is currently browsed at the device.

According to another aspect of the present invention, a non-transitory computer readable recording medium on which a program for implementing a method for converting a browsed content at a device is recorded is provided. The method includes receiving a request signal for information related to the browsed content from an external device; detecting at least one of a document object and a view from the browsed content based on information about the external device contained in the request signal; converting the browsed content into data that can be browsed on the external device according to the at least one of the document object and the view based on the information about the external device; and transmitting the converted data to the external device, wherein the browsed content is currently browsed at the device.

According to another aspect of the present invention, a non-transitory computer readable recording medium on which a program for implementing a method for converting browsed content is recorded is provided. The method includes receiving a request signal for information related to the browsed content from an external device via a plurality of ports to each of which information about the external device is assigned; detecting at least one of a document object and a view from the browsed content based on the information about the external device; converting the browsed content into data that can be browsed on the external device according to the at least one of the document object and the view and according to a respective content type assigned to each of the plurality of ports; and transmitting the data to the external device via the plurality of ports, wherein the browsed content is currently browsed at the device.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE PRESENT INVENTION

Figure 1:
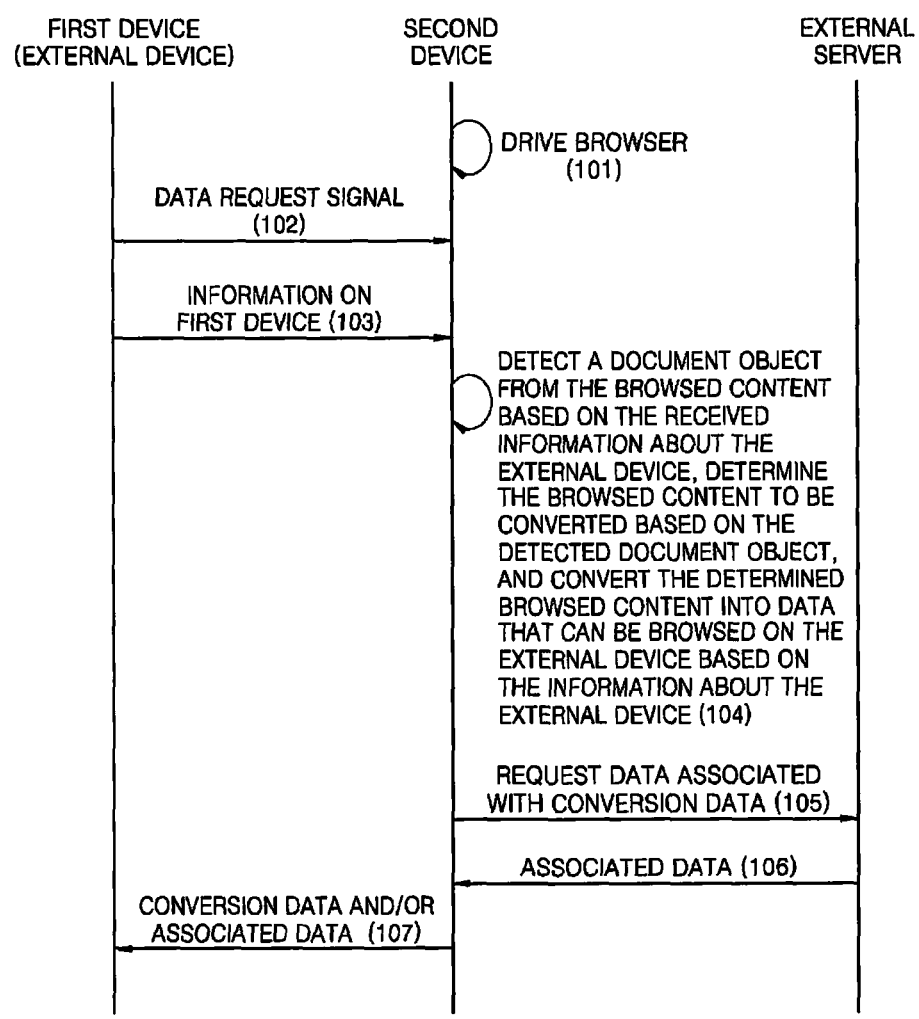
FIG. 1 is a flowchart illustrating a method for converting content, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a flowchart of a method for converting content, according to an embodiment of the present invention.

Referring to FIG. 1, a second device drives a browser in step 101. In general, the browser is an application program that allows a user to view all information on a World Wide Web (WWW). Specifically, the browser enables the user to view all information of a web server on the Internet and to search for hypertext documents. General functions of the a browser include at least opening web pages, providing a list of recently visited Internet addresses (Uniform Resource Locator: URL), memorizing and managing frequently visited URL's, storing and printing web pages, supporting programs for using e-mail & news groups, and editing Hyper Text Marker Language (HTML) documents. In the present embodiment, browsing includes at least moving to resources linked by hyperlinks, entering search key words, reading an e-mail message in an e-mail account, and viewing maps. A browser engine for driving a browser interprets and renders markup-based content. A browser engine on a second device may be the same as or different from a browser engine on a first device connected to the second device via a predetermined communication network. In one embodiment of the present invention, the browser may be an application that is run in an Internet environment as well as a general application that is run on first and second devices.

In step 102, the first device sends a data request signal to a second device. If a user of the first device wishes to acquire information related to content being browsed on the second device, the first device then transmits the data request signal to the second device. For example, in order to capture content being browsed on the second device, the user of the first device may select a recording function button or photo-taking function button in the first device and sends a capture signal to the second device.

In step 103, the first device also sends information about the first device to the second device with the data request signal. Upon receipt of requested data from the second device, the first device sends information on the specification of the first device to the second device in order to run or play back the data on the first device. For example, if the first device has a browser that allows the user to access the Internet, information specifying that the first device has the browser may be sent to the second device. If the first device is a MP3 player, information specifying the first device can play back an audio source may be sent to the second device.

In step 104, the second device converts all or a portion of its currently browsed content into data that can be browsed on the first device based on the information about the first device, so that the content can be driven by the browser engine on the first device. Specifically, the second device detects a browsing context from its currently browsed content and converts all or a portion of the browsed content to data that can be browsed on the first device according to the browsing context.

Context refers to information that defines characteristics of the situation of entities, such as a person, place, object, and time that are considered to affect the interaction between users, systems, or device applications. A browsing context is a collection of one or more documents object and one or more views. In one embodiment, the second device may provide a Document Object Model (hereinafter referred to as "DOM") access interface in order to obtain current context information. A DOM is an object-based document model for interconnecting eXtensible Markup Language (XML) documents through a web browser. A DOM access interface is a platform- and language-neutral interface that allows programs or scripts to dynamically access and update content, structure, and style of documents. The document already processed and viewed by a user can be further modified and the results of the modification can be incorporated back into the document for display. In one embodiment of the present invention, detecting the browsing context means detecting appropriate document objects or views from the currently browsed content so that the content can be driven on the first device. For example, the browsing context that can be detected by a browser of the second device may include details entered by the user until currently browsing the content, accessed internet pages or all text information contained therein, keywords extracted from the text information using a font size or title, a hyperlink currently being brought to user's attention, which is generally indicated by 'Focus' and, title, address, and content in a specific region of a screen currently being viewed by a user or sender of an email.

After detecting the browsing context, the second device extracts all or a portion of the currently browsed content based on the browsing context and converts the extracted content to data that can be appropriately driven on the first device. For example, an Internet browser may be run on the second device. Furthermore, the resulting data may be a URL of a page currently being browsed or the text of an email. If the first device plays back only an image, the resulting data may be an image file or thumbnail.

In step 105, the second device requests data associated with the resulting data as supplementary data from an external server connected thereto via a predetermined communication network such as the Internet. The second device may use the characteristics of its browser to provide extended information through open-Application Programming Interface (API) of Google or Yahoo. For example, if the text of an email does not contain a map nor telephone number of a wedding chapel except for its name, the second device may use Open-API to acquire the map of the wedding chapel through Google or Yahoo. In this case, the second device may make its own determination or receive a request for the data from the first device to request the data from the external server.

In step 106, the second device receives the associated data from the external server. In this case, the second device may convert the received data to a format that is the same as or different from the resulting data. The operations 105 and 106 may be optionally omitted.

In step 107, the second device sends the resulting data alone or together with the associated data.

The method for converting content according to this embodiment of the present invention allows for easy capture of information being browsed on another device using an interface that is familiar to a user of each device, thereby increasing user convenience while allowing efficient sharing of data.

Figure 2:
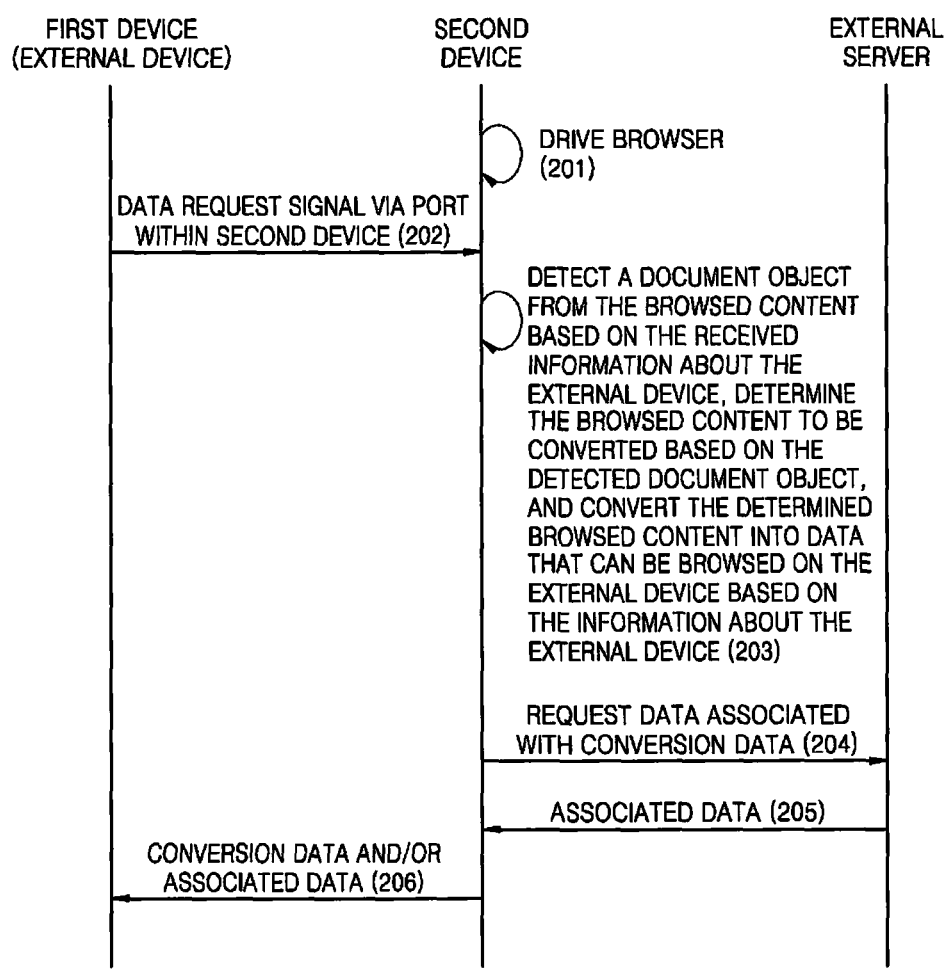
FIG. 2 is a flowchart illustrating a method of converting content, according to another embodiment of the present invention.

FIG. 2 is a flowchart illustrating a method of converting content, according to another embodiment of the present invention.

Referring to FIG. 2, in step 201, a second device drives a browser. Step 201 is performed in the same way as step 101, and a detailed description is provided above with respect to FIG. 1.

In step 202, a first device sends a data request signal to the second device. If a user of the first device wishes to acquire information related to content being browsed on the second device, the first device then transmits a data request signal to the second device. Step 202 differs from step 102 of FIG. 1 in that the first device sends the data request signal to the second device via a port contained in the second device.

Information about the first device is assigned to at least one port within the second device. For example, assuming that the content being browsed on the second device is mail, the second device may include a port for providing keywords such as place and time contained in a mail message, a port for providing the entire thumbnail of the mail, a port for providing the mail or images attached to the mail message, a port for providing data related to multimedia such as background music embedded in the mail message, and a port for providing only audio data. Being aware of a data type that it can handle, the first device is able to request appropriate data via a predefined port. For example, if the first device is an MP3 player with a display, it may request data from a port for providing a thumbnail, a port for providing images, and a port for providing audio data. In the embodiment of the present invention described with reference to FIG. 2, the port may be a Transmission Control Protocol/Internet Protocol (TCP/IP). A TCP/IP port currently available has software-based port numbers ranging from 0 to 65,535 for all kinds of services such as e-mail, WWW, and File Transfer Protocol (FTP) being executed by each device communicating via the Internet. Ports, numbered 0 to 1,023, are separately assigned to specific services by Internet Assigned Number Authority (IANA). Thus, in this embodiment of the present invention, the TCP/IP port may have port numbers in the range of 1,024 to 65,535.

In step 203, after checking a port to which a data request is made, the second device converts all or a portion of its currently browsed content into data that can be browsed on the first device, based on information assigned to the port. More specifically, the second device detects a browsing context from its currently browsed content and converts all or a portion of the browsed content to data that can be browsed on the first device according to the browsing context. For example, if the first device requests data from a port for providing audio data, the second device extracts audio data from the currently browsed content. If the browsed content does not contain the audio data, the second device may convert a text in the content into audio. If the text cannot be converted into audio, an exception may occur in which there is no answer. In this case, the first device is able to handle this situation. Upon receipt of a data request from the first device via a plurality of ports, the second device converts all or a portion of its currently browsed content to data corresponding to each port and transmits the resulting data to the first device via the port.

Steps 204 through 206 are performed in the same way as steps 105 through 107, and are described in detail with reference to FIG. 1.

The method for converting content according to this embodiment of the present invention allows for processing of data for each port to which a data request is made from the first device without the need for the second device to prepare the data, thereby reducing a load in the second device and simplifying the implementation of the entire system.

Figure 3:
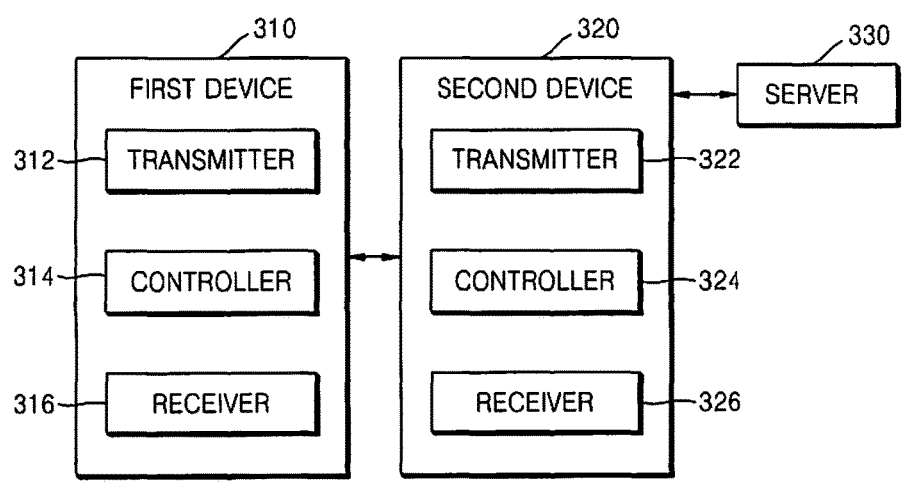
FIG. 3 is a block diagram of an apparatus for converting content, according to an embodiment of the present invention.

FIG. 3 is a block diagram of an apparatus for converting content, according to an embodiment of the present invention.

Referring to FIG. 3, a first device 310 includes a transmitter 312, a controller 314, and a receiver 316. A second device 320 includes a transmitter 322, a controller 324, and a receiver 326.

The first and second devices 310 and 320 are connected to each other via a wireless/wired communication network such as Wi-Fi, Bluetooth, or Zigbee. The second device 320 is also connected to an external server 330 via a wired/wireless communication network such as the Internet.

The second device is a device on which a browser is running The first device 310 requests details of currently browsed content from the second device 320. For example, the second device 320 may be a TV on which an Internet browser is running The first device 310 may be a smartphone that requests a capture of details being browsed on the TV The transmitter 312 of the first device 310 sends a data request signal to the second device 320. For example, if a user of the first device 310 wishes to acquire information related to content being browsed on the second device 320, the transmitter 312 of the first device 310 then transmits a data request signal to the second device 320.

The transmitter 312 of the first device 310 also sends information about the first device 310 to the second device 320 with the data request signal. Upon receipt of requested data from the second device 320, the first device 310 sends information on the specification of the first device 310 to the second device 320 in order to run or play back the data on the first device 310. The controller 314 of the first device 310 determines the properties of the first device 310 and creates information about the specification of the first device 310. The controller 314 controls the overall operations of the first device 310 by managing data received by the receiver 316 and running a browser engine on the first device 310 stored in a storage of the first device 310. The browser engine on the first device 310 may be the same as or different from a browser engine on the second device 320 connected to the first device 310 via a predetermined communication network.

In another embodiment, the transmitter 312 of the first device 310 may send a data request signal to the second device 320 via a port within the second device 320.

Information about the first device 310 is assigned to at least one port within the second device 320. For example, assuming that the content being browsed on the second device 320 is mail, the second device 320 may include a port for providing keywords such as place and time contained in a mail message, a port for providing the entire thumbnail of the mail, a port for providing the mail or images attached to the mail message, a port for providing data related to multimedia such as background music embedded in the mail message, and a port for providing only audio data. The controller 314 of the first device 310 that is aware of a data type that it can handle controls the transmitter 312 to request appropriate data via a predefined port. For example, if the first device 310 is an MP3 player with a display, the controller 314 may request data from a port for providing a thumbnail, a port for providing images, and a port for providing audio data. In an embodiment of the present invention, the port may be a TCP/IP. A TCP/IP port currently available has software-based port numbers ranging from 0 to 65,535 for all kinds of services such as e-mail, WWW, and FTP being executed by each device communicating via the Internet. Since ports numbered 0 to 1,023 are generally assigned to specific services, the TCP/IP port may have port numbers in the range of 1,024 to 65,535.

The controller 324 of the second device 320 drives a browser. In general, the browser is an application program that allows a user to view all information on the WWW. In an embodiment of the present invention, browsing includes moving to resources linked by hyperlinks, entering search key words, reading an e-mail message in an e-mail account, and viewing maps. The browser engine on the second device 320 for driving the browser interprets and renders markup-based content. In one embodiment of the present invention, the browser may be an application that is run in an Internet environment as well as a general application that is run on first and second devices 310 and 320. The browser engine on the second device 320 is stored in a storage of the second device 320 and controlled by the controller 324 of the second device 320.

The receiver 326 of the second device 320 receives a data request signal from the first device 310. The controller 324 of the second device 320 converts all or a portion of currently browsed content into data that can be browsed on the first device 310 based on the information about the first device 310, so that the content can be driven by the browser engine on the first device 310. More specifically, the controller 324 detects a browsing context from the currently browsed content and converts all or a portion of the browsed content to data that can be browsed on the first device 310 according to the browsing context.

In one embodiment of the present invention, the controller 324 of the second device 320 may provide a DOM access interface in order to obtain current context information. In order to detect the browsing context, the controller 324 detects appropriate document objects or views from the currently browsed content so that the content can be driven on the first device 310. For example, the browsing context that can be detected by the browser of the second device 320 may include details entered by the user until currently browsing the content, accessed internet pages or all text information contained therein, keywords extracted from the text information using a font size or title, a hyperlink currently being brought to user's attention, which is generally indicated by 'Focus' and, title, address, and content in a specific region of a screen currently being viewed by a user or sender of an email.

After detecting the browsing context, the controller 324 extracts all or a portion of the currently browsed content according to the browsing context and converts the extracted content to data that can be appropriately driven on the first device 310. For example, an Internet browser may be run on the second device 320. Furthermore, the resulting data may be a URL of a page currently being browsed or the text of an email. If the first device 310 plays back only an image, the resulting data may be an image file or thumbnail.

The controller 324 requests data associated with the resulting data as supplementary data from the external server 330 connected to the second device 320 via a predetermined communication network such as the Internet. For example, the controller 324 may use the characteristics of the browser to provide extended information through open-API of Google or Yahoo.

The receiver 326 of the second device 320 receives the associated data from the external server 330. In this case, the controller 324 may convert the received data to a format that is the same as or different from the resulting data. Requesting the associated data from the external server 330 may be optionally omitted.

The transmitter 322 of the second device 320 may send the conversion data alone to the first device 310 or together with the associated data.

In another embodiment of the present invention, when the first device 310 makes a data request via a predetermined port within the second device 320, the controller 324 checks a port to which such a data request is made. The controller 324 then converts all or a portion of currently browsed content into data that can be browsed on the first device 310, based on information assigned to the port. More specifically, the controller 324 detects a browsing context from the currently browsed content and converts all or a portion of the browsed content to data that can be browsed on the first device 310 according to the browsing context. For example, if the first device 310 requests data from a port for providing audio data, the controller 324 extracts audio data from the currently browsed content. If the browsed content does not contain the audio data, the controller 324 may convert a text in the content to audio. If the text cannot be converted to audio, an exception may occur in which there is no answer. In this case, the first device 310 is able to handle this situation. Upon receipt of a data request from the first device 310 via a plurality of ports, the controller 324 converts all or a portion of the currently browsed content to data corresponding to each port and transmits the resulting data to the first device 310 via the port.

The methods for converting content according to the embodiments of the present invention as described above may be embodied as computer-readable codes on a computer readable recording medium. The computer readable recording medium may be any data storage device that can store data that can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the embodiments of the present invention can be construed by programmers of ordinary skill in the art to which the present invention pertains.

While the present invention has been shown and described with reference to certain embodiments thereof, it will be understood by those of ordinary skill in the art that various changes in form and detail may be made therein without departing from the spirit and scope of the present invention as defined by the following claims. It should be understood that the embodiments described therein should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method for converting content browsed at a device, the method comprising:
   receiving, from an external device, information about a specification of the external device and a request signal for information related to the content which is currently browsed at the device;
   detecting a document object from the browsed content based on the received information about the external device;
   determining the browsed content to be converted based on the detected document object;
   converting the determined browsed content into data that can be browsed on the external device based on the information about the external device;
   requesting data associated with the converted data from an external server via a predetermined communication network;
   receiving the associated data; and
   transmitting the associated data to the external device along with the converted data,
   wherein the document object includes content in a specific region of a screen of the device currently being viewed.

2. The method of claim 1, wherein the document object further includes at least one selected from details entered at the browsed content, accessed internet pages, all text information contained in the internet pages, keywords extracted from text information, a hyperlink, a title, and an address.

3. A non-transitory computer readable recording medium on which a program for implementing a method for converting content browsed at a device is recorded, the method comprising the steps of:
   receiving, from an external device, information about a specification of the external device and a request signal for information related to the content which is currently browsed at the device;
   detecting a document object from the browsed content based on the received information about the external device;
   determining the browsed content to be converted based on the detected document object;
   converting the determined browsed content into data that can be browsed on the external device based on the information about the external device;
   requesting data associated with the converted data from an external server via a predetermined communication network;
   receiving the associated data; and
   transmitting the associated data to the external device along with the converted data,
   wherein the document object includes content in a specific region of a screen of the device currently being viewed.

4. An apparatus for converting content browsed at a device, the apparatus comprising:
   a receiver for receiving, from an external device, information about a specification of the external device and a request signal for information related to the content which is currently browsed at the device and for receiving, from an external server via a predetermined communication network, data associated with the converted data;
   a controller for:
   detecting a document object and the browsed content based on the received information about the external device,
   determining the browsed content to be converted based on the detected document object, and
   converting the determined browsed content into data that can be browsed on the external device based on the information about the external device; and
   a transmitter for sending the converted data and the data associated with the converted data to the external device,
   wherein the document object includes content in a specific region of a screen of the device currently being viewed.

5. The apparatus of claim 4, wherein the document object further includes at least one selected from details entered at the browsed content, accessed internet pages, all text information contained in the internet pages, keywords extracted from text information, a hyperlink, a title, and an address.

6. A non-transitory computer readable recording medium on which a program for implementing a method for converting content browsed at a device is recorded, the method comprising:
   receiving, from an external device, information about a specification of the external device and a request signal for information related to the content which is currently browsed at the device;
   detecting a document object from the browsed content based on the received information about the external device;
   determining the browsed content to be converted based on the detected document object;
   converting the determined browsed content into data that can be browsed on the external device based on the information about the external device;
   requesting data associated with the converted data from an external server via a predetermined communication network;
   receiving the associated data; and
   transmitting the associated data to the external device along with the converted data,
   wherein the document object includes content in a specific region of a screen of the device currently being viewed.

* * * * *